(12) United States Patent
Cuillery et al.

(10) Patent No.: US 9,315,638 B2
(45) Date of Patent: Apr. 19, 2016

(54) PET THERMOPLASTIC POLYMER ARTICLE, AND METHOD FOR THE PRODUCTION OF SUCH AN ARTICLE

(75) Inventors: Pascal Cuillery, Faverges (FR); Michel Demolis, Lancrans (FR); Eric Genthon, Le Grand Lemps (FR)

(73) Assignee: SEB S.A., Ecully (FR)

( * ) Notice: Subject to any disclaimer, the term of this patent is extended or adjusted under 35 U.S.C. 154(b) by 849 days.

(21) Appl. No.: 13/503,670

(22) PCT Filed: Nov. 2, 2010

(86) PCT No.: PCT/FR2010/052345
§ 371 (c)(1),
(2), (4) Date: Jul. 3, 2012

(87) PCT Pub. No.: WO2011/051640
PCT Pub. Date: May 5, 2011

(65) Prior Publication Data
US 2012/0263918 A1 Oct. 18, 2012

(30) Foreign Application Priority Data
Oct. 30, 2009 (FR) ..................... 09 57675

(51) Int. Cl.
*B32B 3/00* (2006.01)
*C08J 3/22* (2006.01)
*A47J 43/28* (2006.01)
*A47J 45/06* (2006.01)
(Continued)

(52) U.S. Cl.
CPC ............... *C08J 3/226* (2013.01); *A47J 43/288* (2013.01); *A47J 45/063* (2013.01); *B29C 45/0013* (2013.01); *C08L 67/02* (2013.01); *B29C 45/1816* (2013.01); *B29K 2067/003* (2013.01); *C08J 2367/02* (2013.01); *C08J 2467/00* (2013.01); *C08K 3/0008* (2013.01); *C08K 3/0033* (2013.01); *C08K 5/0008* (2013.01); *C08K 5/0041* (2013.01); *C08K 5/098* (2013.01); *C08L 83/04* (2013.01); *Y10T 16/44* (2015.01); *Y10T 428/24479* (2015.01)

(58) Field of Classification Search
CPC .... B32B 1/00; B32B 3/00; Y10T 428/24479; Y10T 16/44; A47J 43/288; A47J 45/063; B29C 45/0013; B29C 45/1816; B29C 31/00; B29C 39/00; C08L 67/00; C08L 67/02
USPC .......................... 428/156; 16/110.1, 421, 430
See application file for complete search history.

(56) References Cited

U.S. PATENT DOCUMENTS

| 4,540,729 A | 9/1985 | Williams |
| 5,039,717 A | 8/1991 | Kawakami et al. |

(Continued)

FOREIGN PATENT DOCUMENTS

FR 2552095 A1 3/1985

*Primary Examiner* — Catherine A Simone
(74) *Attorney, Agent, or Firm* — The Webb Law Firm

(57) ABSTRACT

Provided is an injection-molded article made up of a thermoplastic polymer material comprising a polyethylene terephthalate (PET) matrix, and at least one pigment and at least one nucleating agent dispersed in said PET matrix. The thermoplastic polymer material comprises no more than 5 wt % of mineral filler relative to the total weight of the article, and the article has a variable thickness ranging from 0.2 mm to 10 mm, at least two adjacent areas having a difference in thickness of at least 10%. A method for producing such an article is also provided.

14 Claims, 3 Drawing Sheets

(51) Int. Cl.
*B29C 45/00* (2006.01)
*C08L 67/02* (2006.01)
*B29C 45/18* (2006.01)
*B29K 67/00* (2006.01)
*C08K 3/00* (2006.01)
*C08K 5/00* (2006.01)
*C08K 5/098* (2006.01)
*C08L 83/04* (2006.01)

(56) References Cited

U.S. PATENT DOCUMENTS

| | | | |
|---|---|---|---|
| 5,356,972 A * | 10/1994 | Sperling et al. | 524/313 |
| 6,469,083 B1 | 10/2002 | Opalko | |
| 6,689,454 B2 | 2/2004 | Murschall et al. | |
| 7,182,997 B2 | 2/2007 | Murschall et al. | |
| 2004/0112519 A1 * | 6/2004 | Mori | 156/272.8 |
| 2007/0244242 A1 * | 10/2007 | Agarwal et al. | 524/439 |
| 2009/0220715 A1 | 9/2009 | Werink et al. | |

* cited by examiner

PET THERMOPLASTIC POLYMER ARTICLE, AND METHOD FOR THE PRODUCTION OF SUCH AN ARTICLE

BACKGROUND OF THE INVENTION

1. Field of the Invention

This application relates to a thermoplastic polymer material based on polyethylene terephthalate (PET), which is in the form of an injection-moulded article. This invention also relates to a method for producing such an article.

2. Description of Related Art

Articles, in particular cooking utensils, are usually comprised of a polyamide-based (PA) material, which has numerous advantages, and in particular that of being capable of being injection-moulded. However, the polyamide (PA) has the disadvantage of yellowing due to thermal oxidation when it is subjected to a temperature over 200° C. (frying conditions), and of becoming stained in the dishwasher, which causes a temperature increase to 70° C., i.e. 30° C. above the glass transition temperature of the PA. Indeed, at 30° C. above its glass transition temperature, a polymer generally has a free volume sufficient for being sensitive to pigment diffusion. It is for this reason that the PA is sensitive to the presence of staining foods in the dishwasher (for example, carrots, tomatoes or blueberries).

As the spatula is a cooking utensil intended to be in direct contact with foods, any yellowing or staining problem is detrimental because it is perceived by the consumer to show unsatisfactory hygiene. This leads the manufacturer of polyamide (PA) cooking utensils to develop only lines having a dark colour, in order to overcome these problems of staining.

It is therefore desirable to replace the polyamide with a less costly material that does not stain or yellow.

As a replacement material polyethylene terephthalate (PET) is known, which is a thermoplastic polymer that is much less expensive than the polyamide, with a thermal resistance that is equivalent to the polyamide (melting point 255° C.). In addition, the glass transition temperature of PET (80° C.) explains its excellent stain resistance in a dishwasher. Moreover, its thermal stability is better than that of the PA, limiting its yellowing under high temperature. The use of light colours is therefore possible.

The production of spatulas necessarily involves injection-moulding, which alone enables forms of variable thickness to be obtained.

For injection-moulding of a thermoplastic material such as PET, PET is typically used in the form of ready-to-inject granules, i.e. compounded granules (available commercially in this form). These granules typically consist of PET resin, on the one hand, and additives necessary for the injection in particular of the mould-release type, and nucleating on the other hand. The compounding of the PET (which is a method of mixing by melting plastic materials and additives) causes the PET to transition to the molten state, which requires complete drying in order to obtain a residual water content of less than 0.02% and prevent hydrolysis of the polymer in the molten state. This hydrolysis is intended to reduce the molecular mass, detrimental to the mechanical properties of the product. A drying cycle of 6 hours at 160° C. is therefore generally required before compounding of the PET: this explains the higher cost of the PET compounds with respect to the PA compounds, even though the PET resin is more economical than the PA resin!

In this field, the French patent FR 2552095 is known, which describes a moulding composition including PET, a nucleation agent (for example a benzoate), a polycaprolactone with a high molecular weight and an unsaturated epoxidised triglyceride, and fillers such as glass fibres, of which the presence implicitly refers to a compounding operation. This reference is also explicit since FR 2552095 teaches that the mixing of components is performed on the extruder, which is the actual definition of compounding.

SUMMARY OF THE INVENTION

To overcome all or some of the aforementioned disadvantages, the applicant has now developed a method for injection-moulding a thermoplastic polymer composition that makes it possible to do without the use of PET compounds. This method implements, as starting products, a simple non-compounded PET resin, dried with a dryer of the type normally used by transformers, and a masterbatch including pigments and at least one nucleation agent (as well as, optionally, additives necessary for the success of the injection: mould release, crystallising, heat-stabilising, organic and inorganic fillers), advantageously dispersed in polybutylene terephthalate (PBT). With such starting materials, the applicant has developed a method that makes it possible to injection-mould PET articles. More specifically, this invention relates to an injection-moulded article that consists of a thermoplastic polymer material including:

a polyethylene-terephthalate (PET) matrix, and at least one pigment and at least one nucleation agent, in which said pigment and said additive is dispersed in said PET matrix, said article being characterised in that said thermoplastic polymer material comprises no more than 5% by weight of inorganic fillers with respect to the total weight of the article, and in that said article has a non-constant thickness varying between 0.2 mm and 10 mm, with at least two adjacent areas having a difference in thickness of at least 10%.

By article with at least two adjacent areas having a difference in thickness of at least 10%, we mean, in the sense of this invention, an article such as that shown in FIGS. 4 and 5.

The polymer according to the invention is partially crystallised due to the presence of the nucleation agent (which promotes the crystallisation of the polymer), in the polymer material.

As examples of nucleation agents, it is possible in particular to cite inorganic nucleation agents such as talc and silica, organic nucleation agents such as high-molecular-weight carboxylic acids, or alkaline metal salts such as sodium benzoate. Ionomer resins will also be mentioned. Preferably, in the context of this invention, sodium benzoate is used.

By inorganic fillers, we mean, in the sense of this invention, any inert substance of mineral origin, added to the thermoplastic material, enabling the mechanical, electrical or thermal properties thereof to be substantially modified, or enabling the surface appearance to be improved.

Among the inorganic fillers conventionally used to reinforce a polymer and which are, in the context of this invention, limited to 5% by weight with respect to the total weight of the article, a distinction is generally made, for compounds of high diffusion, inorganic fillers such as wollastonite and glass and carbon fibres, talc, beads (solid or hollow), clay and $CaCO_3$.

Advantageously, the PET matrix of the thermoplastic material according to the invention comprises, in addition to polyethylene terephthalate (PET), a second thermoplastic resin to promote the dispersion of additives and pigments in the PET matrix.

Advantageously, this second resin is a polyester resin. However, it is possible to use polycarbonate or polyamide resins.

In a particularly advantageous manner, the polyester resin is polybutylene terephthalate (PBT) because its chemical structure similar to that of PET makes it compatible in PET. In addition, its relatively high melting point (around 220° C.) does not affect the general melting point of the matrix (around 250° C.)

The thermoplastic resins other than the polyester resins (in particular the polycarbonate and polyamide resins), and the polyester resins other than PET and PBT can be used in the context of this invention on the condition that their melting point, or, by default, their glass transition temperature, is preferably above 130° C. Indeed, the part solidifies in a mould of which the control temperature is 140° C. If the part is not completely rigidified at this temperature, it will be ejected with greater difficulty. For example, the use of polyethylene as a dispersant leads to parts that stick to the mould or that become deformed during ejection because they are not rigid enough at this temperature: mould-release problem.

Advantageously, when PBT is used as a dispersant, it represents 1 to 10% by weight of the total weight of the material. Indeed, the applicant has noted that such an amount of PBT enables the dispersion of the additives and/or of the pigments in the matrix to be further improved. Above a content of 10% PBT, it is economically non-beneficial because PBT compounded with its additives and its pigments is then more expensive than PET, while, below 1% PBT, the amount of PBT is then insufficient to have any effect.

Advantageously, said thermoplastic material according to the invention comprises, in addition to the nucleation agent, other additives intended for injection moulding.

As additives that can be used according to the invention (other than nucleation agents), mention may be made in particular heat stabilisers, mould-release agents, lubricants and inorganic or organic fillers.

As examples of heat stabilisers, mention may be made in particular primary antioxidants of the hindered phenol family and secondary aromatic amines, secondary antioxidants (thioethers, thioesters, as well as phosphites).

As examples of mould-release agents, mention may be made in particular silicones, and in particular silicone oils.

As examples of lubricants, mention may be made in particular stearates such as calcium stearate or waxes of paraffin, polyethylene (modified or not), ester and montanic acid.

As examples of fillers, mention may be made in particular organic fillers such as PTFE, PPS or PA powder or inorganic fillers such as talc, calcium carbonate, wollastonite, barium sulphate, kaolin, graphite, mica, silica and silicates.

As inorganic or organic pigments (soluble or insoluble) that can be used in the thermoplastic material according to the invention, mention may be made in particular titanium dioxide, oxides, hydroxides and sulphides of metal ions, molecules with an azo group, the phthalocyanine and anthraquinone family and carbon black.

Preferably, the article according to the invention is a cooking utensil, for example a spatula or a lid knob or a portion of a preservation container (for example, the platter of a cheese container).

Finally, this invention relates to a method for producing an article by moulding in an injection press, including the following steps:
a) introducing a thermoplastic polymer composition including polyethylene terephthalate into a hopper, and introducing a masterbatch of at least one pigment into a tank;
b) simultaneously injecting the thermoplastic polymer composition and the masterbatch into an injection cylinder communicating with said hopper and said tank via a dosing apparatus;
c) plasticising the thermoplastic polymer composition and the masterbatch so as to form, in the injection cylinder, a homogeneous molten plastic material;
d) transferring the molten plastic material to a mould; and
e) pressurising the mould so as to form the moulded article; then
f) setting the mould at a controlled temperature so as to rigidify the moulded article and eject it;

said method being characterised in that the thermoplastic polymer composition initially introduced into the hopper includes no more than 5% filers and is in the form of a non-compounded resin with a residual water percentage that is no more than 0.02% with respect to the total weight of said composition, and in that the masterbatch also contains at least one nucleation agent.

By masterbatch, we mean, in the sense of this invention, a dispersion, at high concentration, of additives and pigments in a macromolecular substance compatible with the plastic material to be coloured, in which the amount of additive and pigment does not generally exceed 70% by weight of the masterbatch. The nucleation agent is as defined above: preferably, sodium benzoate is used.

According to an advantageous embodiment of the method of the invention, the masterbatch also comprises a thermoplastic resin for dispersing the additives and the pigments of the masterbatch. This thermoplastic resin is as defined above.

Preferably, it is PBT, which advantageously represents 5% by weight of the total weight of the article.

The additives and pigments that can be used in the masterbatch of the method of the invention are as defined above.

BRIEF DESCRIPTION OF THE DRAWINGS

Other advantages and special features of this invention will appear in the following description, provided by way of a non-limiting example and with reference to the appended figures:

The same elements shown in FIGS. 1 to 3 are identified by the same numeric references.

FIGS. 1 to 3 show an injection press 1 typically used for the injection moulding of articles made of a thermoplastic polymer material, in particular based on PET. The injection press 1 comprises:
an injection cylinder 2 in which an injection screw 21 moves, of which the movement is controlled by an injection cylinder 22,

Figure 1:
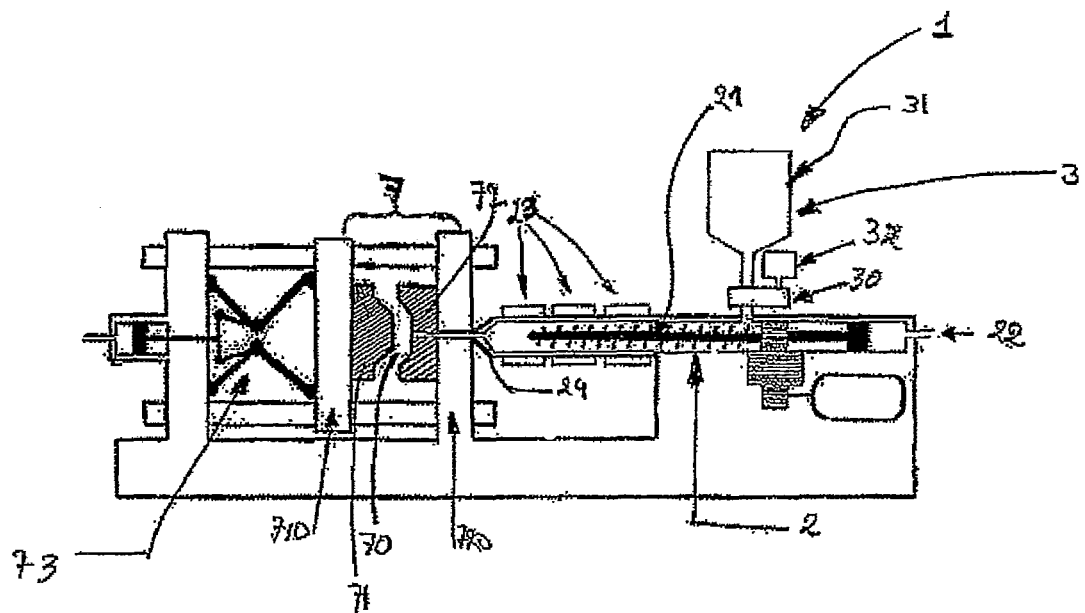
FIG. 1 shows a diagrammatic cross-section view of an injection press typically used for injection moulding.

DETAILED DESCRIPTION OF THE INVENTION a heating resistor 23 surrounding the injection cylinder 22, a feed device 3, with a dosing apparatus 30 communicating with said injection cylinder 2, in which said feed device 3 comprises a hopper 31 for receiving a thermoplastic polymer composition 40, 41, and a tank 32 for receiving a masterbatch 50, 51 of at least one pigment, a mould 7 comprising two portions 71, 72 opposite one another that define at least one impression 70, in which one of the mould portions 72 is attached to an almost stationary platform 720 and the other portion 71 of said mould 7 is attached to a mobile platform 710, which is controlled by a hydraulic piston 73, with direct or indirect attack, by ball and socket joints or by mechanical control, and at least one injection nozzle 24 arranged at the end of said injection cylinder 2 in order to put it in communication with the impression of the mould 70.

Figure 2:
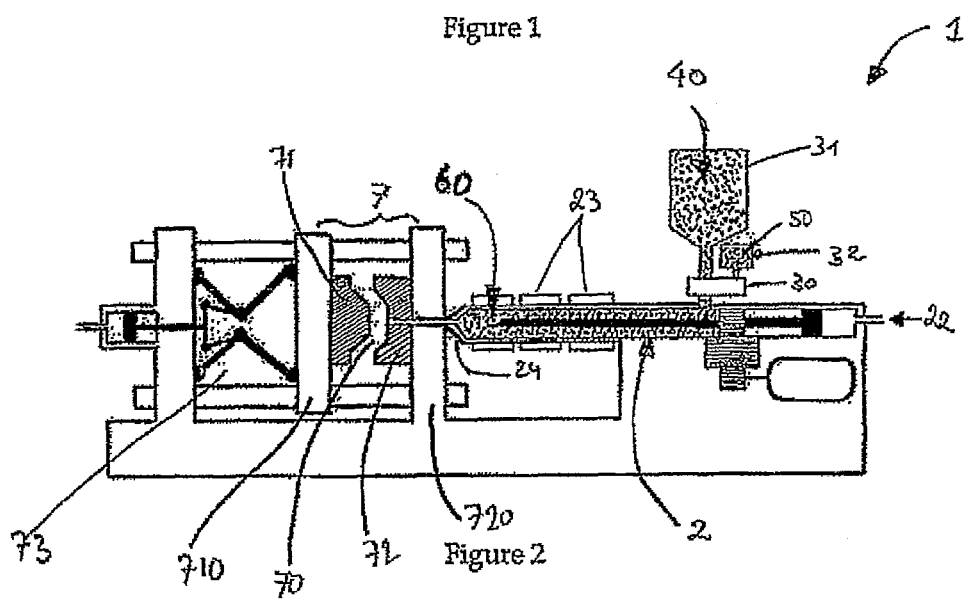
FIG. 2 shows the injection press shown in FIG. 1, in which this press is implemented in the context of injection moulding of a PET compound in accordance with the prior art.

FIG. 2 shows the arrangement of the different starting materials 40, 50 used to produce an article by moulding in an injection press according to a method of the prior art. A thermoplastic composition 40 consisting of ready-to-inject PET granules (compound comprised of PET resin and additives necessary for the success of the injection) is introduced into the hopper 31, and a masterbatch of pigments 50 is introduced into the tank 32 of the feed device 3 of the press 1.

Figure 3:
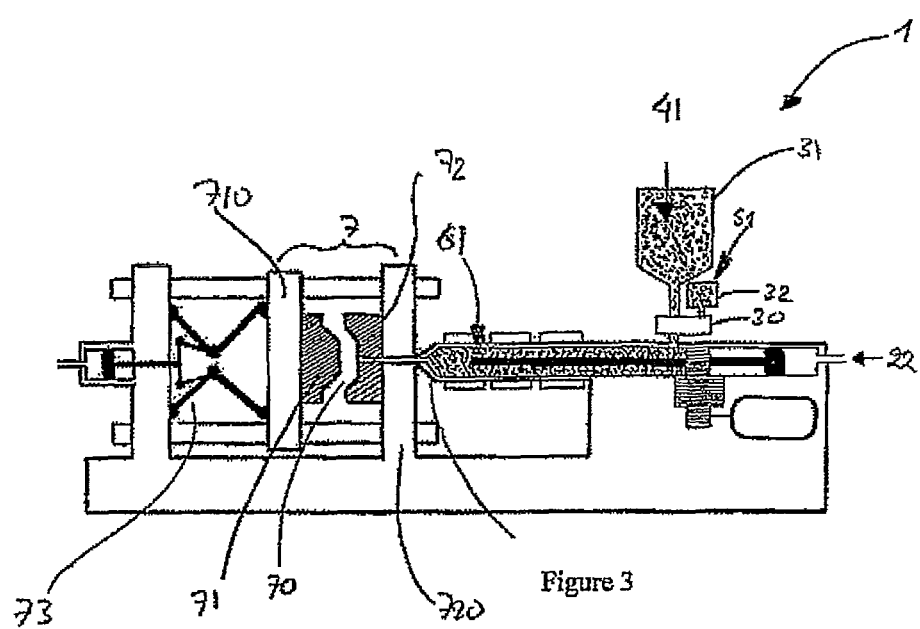
FIG. 3 shows the injection press shown in FIGS. 1 and 2, in which this press is implemented in the context of the injection moulding of a PET resin in accordance with the method according to the invention.

FIG. 3 shows the arrangement of the different starting materials 41, 51 used to produce an article by moulding in an injection press according to the method of the invention. A thermoplastic composition 41 consisting of non-compounded PET granules (free of fillers, pigments and additives with a moisture content of less than 0.02%) is introduced into the hopper 31, and a masterbatch 51 of pigments and additives necessary for the success of the injection is introduced into the tank 32.

We will now describe in detail the different steps of the method following the introduction of the starting materials into the hopper 31. These steps are identical for the method according to the invention, of which the feed step is shown in FIG. 3 and the method according to the prior art of which the feed step is shown in FIG. 2.

After the step of feeding the starting materials into the feed device 3, they are injected simultaneously, via the dosing apparatus into the injection cylinder 2.

The mixing of these compounds can be performed dry, in the dosing apparatus, of the thermoplastic polymer composition and the masterbatch in the cylinder: in this case, it is a mixer-dosing apparatus.

The mixing can also be performed in the cylinder (in the molten state).

Another way to proceed can also consist of producing a dry blend: this involves mixing granules of the masterbatch and of the non-compounded resin, then introducing this mixture of granules into the dryer and passing this mixture into the hopper in order to inject it. This makes it possible to do without the dosing apparatus, but remains a less precise technique, requiring more manipulation.

Then, this step of injecting starting materials into the cylinder 2 is followed by a phase of plasticisation by melting of the thermoplastic polymer composition and the masterbatch in order to obtain a molten plastic material 60, 61. This melting is performed under the combined action of the heat produced by the heating resistor 23 surrounding the cylinder 2 and by the heat produced by the friction of the granules as they move toward the front of the cylinder 2.

The molten plastic material 60, 61 thus obtained is then transferred from the front of the cylinder 2 via the injection nozzle 23 to the impression 70 of the mould 7, by applying pressure on the injection screw 21: the injection cylinder 22 pushes the screw 21 forward.

Once the impression 70 of the mould is filled with the molten plastic material 60, 61, the impression 70 is pressurised by exerting a pressure on the mobile platform 710, which is controlled by a hydraulic piston 73 with direct or indirect attack, by ball and socket joints or by a mechanical control. The moulded article is then formed, which is rigidified by cooling and which can then be ejected.

Figure 4:
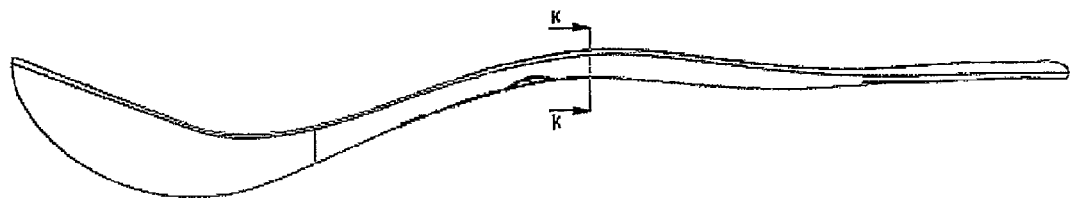
FIG. 4 shows a diagrammatic longitudinal cross-section view of an example of an article injection-moulded according to the invention.
Figure 5:
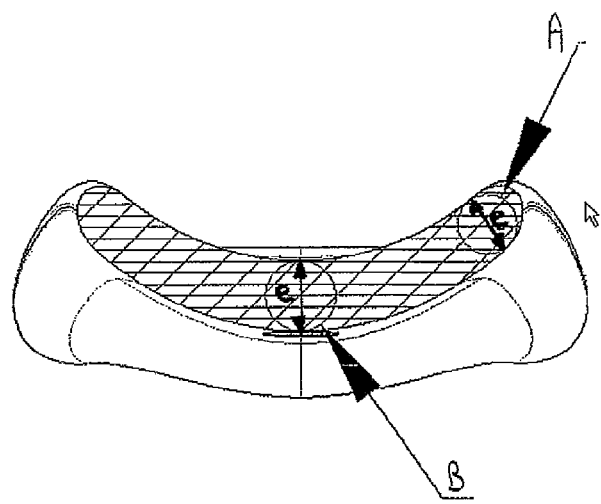
FIG. 5 shows a diagrammatic transverse cross-section view according to K-K of the article shown in FIG. 4.

FIGS. 4 and 5 show an example of an article injection-moulded according to the invention, in this case a spatula.

FIG. 4 shows the change in the profile of the spatula according to the direction of elongation, while FIG. 5 shows the change in profile of the spatula transversally to the direction of elongation, in the direction of the thickness e, with, in the location of the cross-section K-K (shown in FIG. 4), two adjacent areas A and B, or in a continuum, in which the thickness e changes: this corresponds to the diameter inscribed in areas A and B, and varies from 3.22 mm (area B) to 3.76 mm (area A), corresponding to a variation in thickness of around 16.8%.

EXAMPLES

Products

Thermoplastic Polymer Compositions:

PET resin 41, which can be either the resin sold under the trade name Reseko™ by the Tergal Industries company or the resin sold under the trade name T74F9 also by the Tergal Industries company:

having an intrinsic viscosity of 0.74 for the two resins, and having been previously subjected to a preliminary drying treatment performed conventionally with a dryer normally used by transformers in order to obtain a resin with a residual water content of less than 0.02% compounded ready-to-inject PET granules 41, sold by the Dupont company under the trade name Rynite® 520.

Masterbatches:

Masterbatch 51 sold by the ELIAN company, this mixture comprises (percentage given with respect to the total weight of the part):

2.94% PBT (polybutylene terephthalate), which does not require any particular drying: a conventional baking cycle of 2 hours at 80° C. is sufficient, additives distributed as follows:

0.72% silicone oil as a mould-release agent 0.6% sodium benzoate as a nucleating agent, 0.24% of a hindered phenol (Irgarnox 145 sold by the CIBA company, content 0.12%) and a phosphate (Irganox 168, CIBA, content 0.12 as a heat stabiliser)

0.6% PTFE powder as an organic filler 0.9% pigments (in particular iron oxides)

Masterbatch 50

2% PBT 0.9% pigment

Test

The inorganic filler content is evaluated by measuring the residual ash content after calcination for one hour at 700° C.

EXAMPLES

Example 1

According to the Invention

The PET resin 41 is subjected to a preliminary drying treatment in a dryer traditionally used by transformers.

Then, in accordance with the operational diagram shown in FIG. 3, it is introduced into the hopper 31 of an injection press 1, which comprises a mould with four spatula impressions 70, of which the temperature is controlled at 140° C.

Then, the masterbatch 51 is introduced into the tank 32.

The resin 41 and the masterbatch 51 are then simultaneously injected into the cylinder 2 via the dosing apparatus 30.

The temperature at the inlet of the press 1 is 250° C., so as to be capable of melting the polymer composition 41 and the masterbatch 51.

A molten plastic material is obtained, which is transferred by 4 injection nozzles 23 of which the temperature is controlled at 280° C., to the mould 70 with an injection pressure of 30 bars. The mould closure pressure is 260 tons and the residence time of the molten plastic material in the mould 70 is only 5 seconds.

The spatulas thus obtained have a residual ash content of less than 5%.

Example 2

Comparative

As above, spatulas are prepared from PET granules 40 and the masterbatch 50.

The process conditions are identical to those of example 1.

The spatulas thus obtained have a residual ash content on the order of 20%.

The invention claimed is:

1. An injection-moulded article that consists of a thermoplastic polymer material including:
   a polyethylene-terephthalate (PET) matrix, and
   at least one pigment and at least one nucleation agent, in which said pigment and said nucleation agent is dispersed in said PET matrix,
   said article being characterised in that said thermoplastic polymer material comprises no more than 5% by weight of inorganic fillers with respect to the total weight of the article, and
   in that said article has a non-constant thickness varying between 0.2 mm and 10 mm, with at least two adjacent areas having a difference in thickness of at least 10%,
   wherein said injection-moulded article is a cooking utensil.

2. The article according to claim 1, characterised in that the nucleation agent is chosen from inorganic nucleation agents, organic nucleation agents, alkaline metal salts and ionomer resins.

3. The article according to claim 2, characterised in that the nucleation agent is sodium benzoate.

4. The article according to claim 1, characterised in that said thermoplastic polymer material comprises, in addition to the nucleation agent, other additives intended for injection moulding, which are chosen from heat stabilisers, mould-release agents, lubricants and inorganic or organic fillers.

5. The article according to claim 4, characterised in that said thermoplastic polymer material also comprises at least one mould-removal agent chosen from silicones.

6. The article according to claim 1, characterised in that the thermoplastic polymer material comprises, in addition to PET, a second thermoplastic resin.

7. The article according to claim 6, characterised in that said second thermoplastic resin is chosen from the polyester, polycarbonate and polyamide resins.

8. The article according to claim 7, characterised in that said second thermoplastic resin is a polyester resin.

9. The article according to claim 8, characterised in that said polyester resin is PBT, representing 1 to 10% by weight of the total weight of the article.

10. The article according to claim 1, characterised in that it is a spatula.

11. The article according to claim 1, characterised in that it is a lid knob.

12. The article according to claim 2, characterised in that said thermoplastic polymer material comprises, in addition to the nucleation agent, other additives intended for injection moulding, which are chosen from heat stabilisers, mould-release agents, lubricants and inorganic or organic fillers.

13. The article according to claim 3, characterised in that said thermoplastic polymer material comprises, in addition to the nucleation agent, other additives intended for injection moulding, which are chosen from heat stabilisers, mould-release agents, lubricants and inorganic or organic fillers.

14. An injection-moulded article that consists of a thermoplastic polymer material including:
   a polyethylene-terephthalate (PET) matrix, and
   at least one pigment and at least one nucleation agent, in which said pigment and said nucleation agent is dispersed in said PET matrix,
   said article being characterised in that said thermoplastic polymer material comprises no more than 5% by weight of inorganic fillers with respect to the total weight of the article, and
   in that said article has a non-constant thickness varying between 0.2 mm and 10 mm, with at least two adjacent areas having a difference in thickness of at least 10%,
   wherein the thermoplastic polymer material comprises, in addition to PET, a second thermoplastic resin that is PBT, representing 1 to 10% by weight of the total weight of the article.

* * * * *